UNITED STATES PATENT OFFICE.

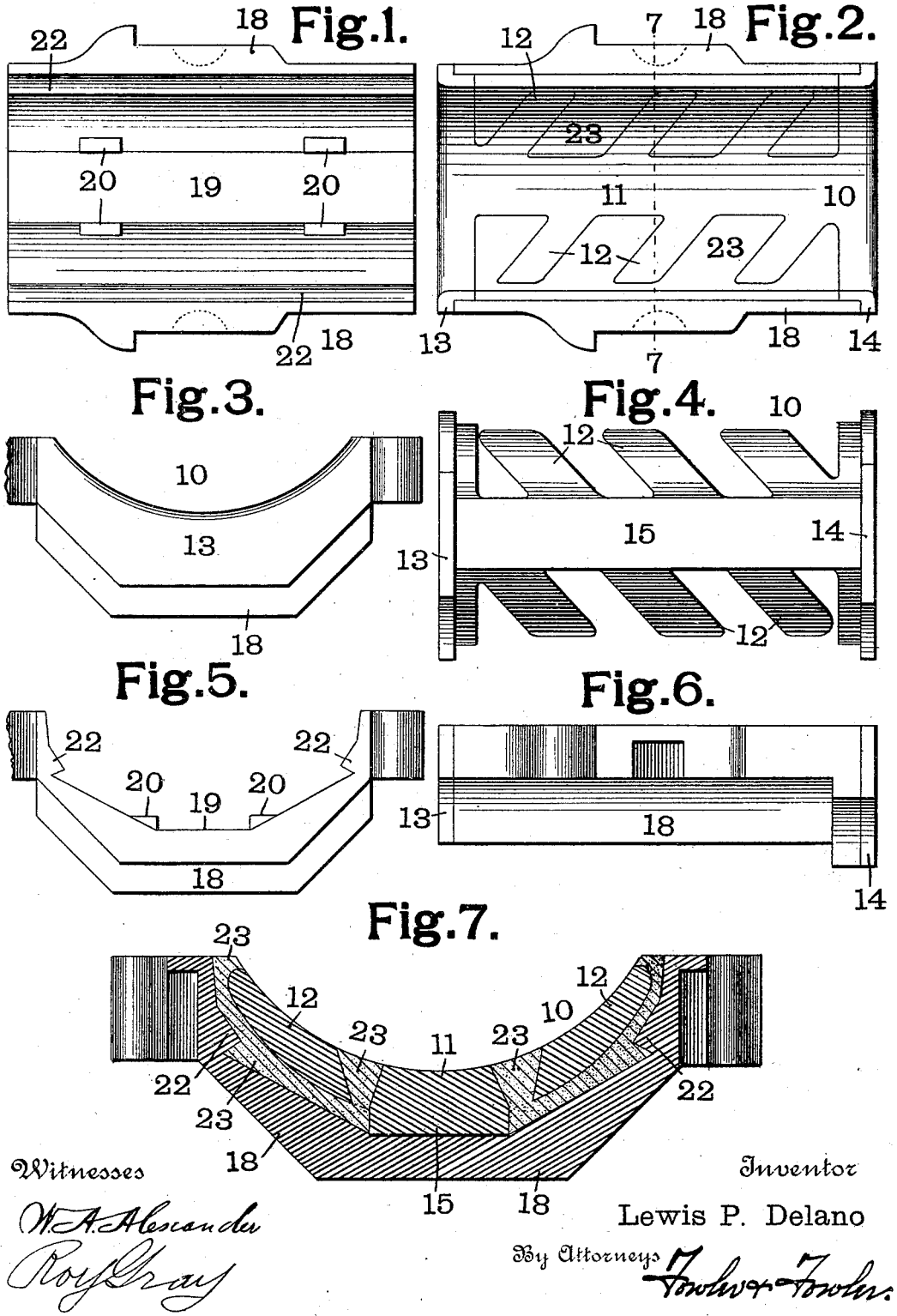

LEWIS P. DELANO, OF ST. LOUIS, MISSOURI.

JOURNAL-BEARING.

SPECIFICATION forming part of Letters Patent No. 671,586, dated April 9, 1901.

Application filed September 24, 1900. Serial No. 30,888. (No model.)

*To all whom it may concern:*

Be it known that I, LEWIS P. DELANO, a citizen of the United States, residing at the city of St. Louis, in the State of Missouri, have invented certain new and useful Improvements in Journal-Bearings, of which the following is such a full, clear, and exact description as will enable any one skilled in the art to which it appertains to make and use the same, reference being had to the accompanying drawings, forming part of this specification.

My invention relates to improvements in journal-bearings, and more particularly to improvements in that class of bearings described in Letters Patent No. 627,985, granted to me July 4, 1899.

The object of my invention is to adapt the form of bearing described in the above-mentioned Letters Patent to that form of bearing which is used in railway-cars.

My invention consists in the various novel features and details of construction, all of which are described in the following specification and pointed out in the claims affixed hereto.

In the accompanying drawings, which illustrate one form of bearings made in accordance with my invention, Figure 1 is a top plan view of the outer shell or casing. Fig. 2 is a top plan view of the complete bearing. Fig. 3 is an end view of the complete bearing. Fig. 4 is a bottom plan view of the inner shell. Fig. 5 is an end view of the outer shell. Fig. 6 is a side view of the complete bearing, and Fig. 7 is an enlarged section on the line 7 7 of Fig. 2.

Like marks of reference refer to similar parts in the several views of the drawings.

10 is an inner shell of the bearing, which is composed of a central strip 11, lateral strips 12, and end flanges 13 and 14. The lateral strips 12 are preferably placed at an angle, as best shown in Figs. 2 and 4. Projecting downward from the central strip 11 is a rib 15. The upper face of the shell 10 is made concave, so as to fit the axle of a car.

18 is an outer shell or casing, which is made of the usual form and is preferably of cast-iron. The shell or casing 18 conforms to the general shape of the bottom of the shell 10. The casing 18 is provided in its center with a flat groove 19, which is adapted to receive the downwardly-projecting rib 15. At either side of the groove 19 are one or more lugs 20, which hold the rib 15 from moving laterally out of the groove 19. Formed on the inner face of the shell or casing 18, near each edge of the same, is a ridge 22.

In forming my bearing the outer shell 18 and the inner shell 10 are cast separately, the inner shell being preferably made of bronze, brass, or other similar hard metal, and is preferably tinned before being placed in the outer shell 18. The shells are placed together and then placed around a suitable mandrel or axle, and Babbitt or other fusible metal 23 is poured into the space between the inner and outer shells and between the lateral strips 12, so as to completely fill the same and hold the two shells firmly together. This result is obtained by means of the ridges 22 and the shape of the strips 11 and 12 of the inner shell, which are wider at the bottom part than the top, as best shown in Fig. 7.

Having fully described my invention, what I claim as new, and desire to secure by Letters Patent of the United States, is—

1. In a journal-bearing, an outer shell, ridges on the inner side of said shell adjacent to the edges thereof, an inner shell forming part of the wearing-surface, and a fusible metal also forming a part of the wearing-surface and holding said shells together.

2. In a journal-bearing, an outer shell, an inner shell consisting of a central strip resting against said outer shell and lateral strips out of contact with said outer shell, and an intermediate layer of fusible metal holding said shells together and also forming part of the wearing-surface.

3. In a journal-bearing, an outer shell, an inner shell consisting of a central strip resting against the outer shell and lateral strips out of contact with said outer shell, an intermediate layer of fusible metal holding said shells together and forming part of the wearing-surface, and end flanges carried by said inner shell and projecting over the ends of said outer shell.

4. In a journal-bearing, an outer shell having a central flat groove formed therein, an inner shell provided with a central strip fitting in said groove and lateral strips held out of contact with said shell, and an intermediate layer of fusible metal holding said shells together.

5. In a journal-bearing, an outer shell having ridges on its inner side adjacent to the edges thereof, an inner shell consisting of a central and lateral strips, said central strip being in contact with the outer shell and the lateral strips being held out of contact therewith, and an intermediate layer of fusible metal holding said shells together and forming part of the wearing-surface.

6. In a journal-bearing, an outer shell, an inner shell consisting of a central strip resting against said outer shell and lateral strips out of contact with said outer shell, said lateral strips being wider at the bottom than at the top, and an intermediate layer of fusible metal holding said shells together and also forming part of the wearing-surface.

7. In a journal-bearing, an outer shell, an inner shell consisting of a central strip resting against said outer shell and lateral strips out of contact with said outer shell, said lateral strips being arranged obliquely to said central strip, and an intermediate layer of fusible metal holding said shells together and also forming part of the wearing-surface.

In testimony whereof I have hereunto set my hand and affixed my seal in the presence of the two subscribing witnesses.

LEWIS P. DELANO. [L. S.]

Witnesses:
JAMES H. BRYSON,
W. A. ALEXANDER.